United States Patent [19]

Rabin

[11] Patent Number: 6,081,782
[45] Date of Patent: Jun. 27, 2000

[54] VOICE COMMAND CONTROL AND VERIFICATION SYSTEM

[75] Inventor: Michael D. Rabin, Manalapan, N.J.

[73] Assignee: Lucent Technologies Inc., Murray Hill, N.J.

[21] Appl. No.: 08/175,326

[22] Filed: Dec. 29, 1993

[51] Int. Cl.[7] .............................. G10L 15/22; G10L 17/00
[52] U.S. Cl. ........................ 704/275; 704/246; 704/251
[58] Field of Search ................................ 395/2.84, 2.82; 379/88, 89

[56] References Cited

U.S. PATENT DOCUMENTS

| | | | |
|---|---|---|---|
| 4,363,102 | 12/1982 | Holmgren et al. | 364/513 |
| 4,798,322 | 1/1989 | Bernstein et al. | 235/487 |
| 5,127,043 | 6/1992 | Hunt et al. | 379/88 |
| 5,146,503 | 9/1992 | Cameron et al. | 381/43 |
| 5,181,237 | 1/1993 | Dowden et al. | 379/88 |
| 5,202,929 | 4/1993 | Lemelson | 382/2 |
| 5,216,720 | 6/1993 | Naik et al. | 381/43 |
| 5,274,695 | 12/1993 | Green | 379/88 |
| 5,293,452 | 3/1994 | Picone et al. | 395/2.59 |
| 5,297,183 | 3/1994 | Bareis et al. | 379/59 |
| 5,297,194 | 3/1994 | Hunt et al. | 379/88 |
| 5,325,421 | 6/1994 | Hou et al. | 379/67 |

OTHER PUBLICATIONS

J. Naik, "Speaker Verification: A Tutorial", IEEE Communications Magazine, Jan. 1990, vol. 28, Issue 1, pp. 42–48.
M. Birnbaum, et al. "A Voice Password System for Access Security", AT&T Technical Journal, Sep.–Oct. 1986, vol. 65, Issue 5, pp. 68–74.

*Primary Examiner*—David R. Hudspeth
*Assistant Examiner*—Harold Zintel
*Attorney, Agent, or Firm*—Thomas A. Restaino; Kenneth M. Brown

[57] ABSTRACT

A voice command control and verification system and method stores for each authorized user, one or a series of speech models of voice commands or phrases uttered by the authorized user. Each speech model has an associated action component which specifies the specific action that the authorized user desires in response to the issuance of the corresponding voice command. Each user has a means of asserting his or her claimed identity to the system, preferably without an overt action such as the entry of digits. When an identity is asserted, and a voice command is thereafter spoken by a person, the system first matches a model of the voice command against the stored models for the user having the claimed identity. If there is a match, so that the voice command can be uniquely interpreted as corresponding to its associated action component, the system then verifies the claimed identity of the user by comparing the vocal characteristics contained in the same command with the vocal characteristics of the stored model. Upon successful verification, the command is executed in accordance with the associated action component. The user of the system has thus issued only a single command to both operate the system and to verify his or her identity.

9 Claims, 5 Drawing Sheets

FIG. 6

| USER ID (601) | SPEECH COMMAND (602) | ACTION COMMAND (603) |
|---|---|---|
| 1234 | HOME<br>OFFICE<br>CAR<br>⋮ | 908-957-1234<br>908-949-3000<br>908-400-1888<br>⋮ |
| 1235 | MOM<br>DAD<br>SIS<br>⋮ | 908-957-1777<br>908-949-3111<br>908-400-1999<br>⋮ |
| 9876 | HOME<br>FAX<br>PAGER<br>⋮ | 908-957-1288<br>908-949-3222<br>908-400-1666<br>⋮ |
| ⋮ | ⋮ | ⋮ |
| 9999 | LOAN<br><br>SAVING<br>⋮ | RETRIEVE BAL. FOR ACCT. XXX<br>RETRIEVE BAL. FOR ACCT. YYY<br>⋮ |

VOICE COMMAND CONTROL AND VERIFICATION SYSTEM

FIELD OF THE INVENTION

This invention relates generally to a system and method for providing controlled access to a resource such as the telecommunications network, an automated teller machine, or the like, and, in particular, to a speech-based system that enables the user to speak a single command in order to both verify his or her identity as well as to indicate the action or service that the user desires to obtain.

BACKGROUND OF THE INVENTION

Persons that use present day systems to access a resource such as the telecommunications network, an automated teller machine, or some other similar resource, find that they must first verify their identity and then enter a command in order to obtain a desired service or action. Typically, these actions require three separate steps: (1) the user makes an identity claim; (2) that claim is verified; and (3) the user issues a command to the system. Verification of identity can itself be complicated, as systems today sometimes require a user to enter a large number of hard to remember digits, or to assert an identity and then provide some independent verification, such as a fingerprint, a retinal pattern, or a personal identification number (PIN). This is time consuming and often frustrating. The ideal arrangement would be to simply enable the identity of a user to be authenticated, and then permit that user to access a resource, all by simply uttering a single voice command. In the context of gaining access to a telecommunications network, in an ideal system, a caller would be able to simply say who he wanted to call, and the system would identify and verify the caller and then complete the call; the caller could thus simply say "Call Home", or some such similar phrase, and the call would be placed and charged to the correct and authorized account. The ideal arrangement, in the context of gaining access to an automated teller machine, would be to issue a voice command, such as "check balance", without having to enter a secret PIN or provide a physical input such as a fingerprint.

The type of true speaker identification capability described above is technologically unattainable at present, because the storage and data processing capacity that would be required to deal with voice samples received from a large number of potential access seekers does not exist, even in the largest distributed processing systems. A compromise, described in U.S. Pat. No. 5,127,043 issued to Hunt et al. on Jun. 30, 1992, employs speaker independent voice recognition to identify who the caller purports to be, and then speaker dependent processing to verify that the characteristics of that caller's voice sample match those stored for the purported caller. This means that a caller can speak a series of digits serving as the identity claim and verification phrase, and then speak a command. Because a user must still speak his or her number, and that number must be appropriately recognized and processed before the user can then speak additional commands, the goal of saying "Call Home" without explicit entry of an identity claim and without performing a verification step, is thus still not attainable at the present time. Another approach, also in the context of a telecommunications system, is described in U.S. Pat. No. 5,181,237, issued to Dowden et al. on Jan. 19, 1993. In that patent, customers are assigned specific individual telephone numbers which, when dialed are routed to a switching system containing prerecorded phrases in the voice of that customer. These phrases might be phrases such as "Mom", "Broker", "Home", "Secretary", and so on, each having an associated stored telephone number. When the customer dials his or her personal number, the call is connected to the switching system, and the prerecorded phrases for that customer are retrieved, so that a command issued by the customer can be matched against the stored phrases. If there is a match, the recognized command is executed by completing the call to the stored number associated with the command. In this way, a customer can simply call the system and say "Call Home". While the Dowden approach thus has certain advantages it does not address the question of security or access control, which is necessary to avoid access by unauthorized individuals.

SUMMARY OF THE INVENTION

In accordance with the present invention, a voice command control and verification system and method stores for each authorized user, one or a series of speech models of voice commands or phrases uttered by the authorized user. Each speech model has an associated action component which specifies the specific action that the authorized user desires in response to the issuance of the corresponding voice command. Each user has a means of asserting his or her claimed identity to the system, preferably without an overt action such as the entry of digits. When an identity is asserted, and a voice command is thereafter spoken by a person, the system first matches a model of the voice command against the stored models for the user having the claimed identity. If there is a match, so that the voice command can be uniquely interpreted as corresponding to its associated action component, the system then verifies the claimed identity of the user by comparing the vocal characteristics contained in the same command with the vocal characteristics of the stored model. Upon successful verification, the command is executed in accordance with the associated action component. The user of the system has thus issued only a single command to both operate the system and to verify his or her identity.

In the context of a telecommunications system, the present invention assigns to each user a specific unique telephone number that the user dials to access the telecommunications network, and stores for each user a series of voice commands that can be recognized by a speech recognition system and that can be used to verify the identity of a user in a speaker verification system. The commands can be call destinations, each having an associated destination telephone number. When the user accesses the system by dialing his or her unique number, the user simply says "Call Home" or any other pretrained command utterance. Speech recognition is performed, by matching the command with one of the stored commands for that user. If a command is matched, the identity of the caller is then verified by comparing the vocal characteristics of the same command with the previously stored vocal characteristics for the user, for that command utterance. Once the identity of the caller is verified, the command is executed by completing the call to the desired destination using the telephone number associated with the command.

The present invention is not limited to call completion services. It can be used to provide a wide array of functionality to a user in conjunction with a telecommunications system, once the identity of the user is verified by comparing stored speech characteristics associated with the dialed number to the characteristics of the person placing the call. This could include access to calling or credit card services, access to voice messaging services, and the like. Note also that since the present invention does not require the input of a digit sequence for verification purposes, the platform providing the service can be accessed from a rotary telephone as well as a phone equipped with touch tone dialing. Also, the unique number to be dialed by each card holder may be assigned based, at least in part, on the preferences of the caller. For example, the call may be made to a "500" number, where some or all of the seven additional digits are selected by the card holder.

The present invention is not limited to use in a telecommunications environment. It may be used, for example, in connection with an automated teller machine (ATM) in which a bank customer makes an identity claim by inserting a bank teller machine card into an ATM machine and then issues a voice command to, for example, determine his or her balance or withdraw funds from his or her account. Indeed, the system can prevent unauthorized access, while providing convenient access for authorized individuals, with respect to any resource or device, such as an automobile, a bank vault, and so on.

BRIEF DESCRIPTION OF THE DRAWING

The present invention will be more fully appreciated by consideration of the following detailed description, which should be read in light of the accompanying drawing in which:

FIG. 6 is a diagram illustrating the arrangement of a typical record stored in database 113 of FIG. 1.

DETAILED DESCRIPTION

Figure 1:
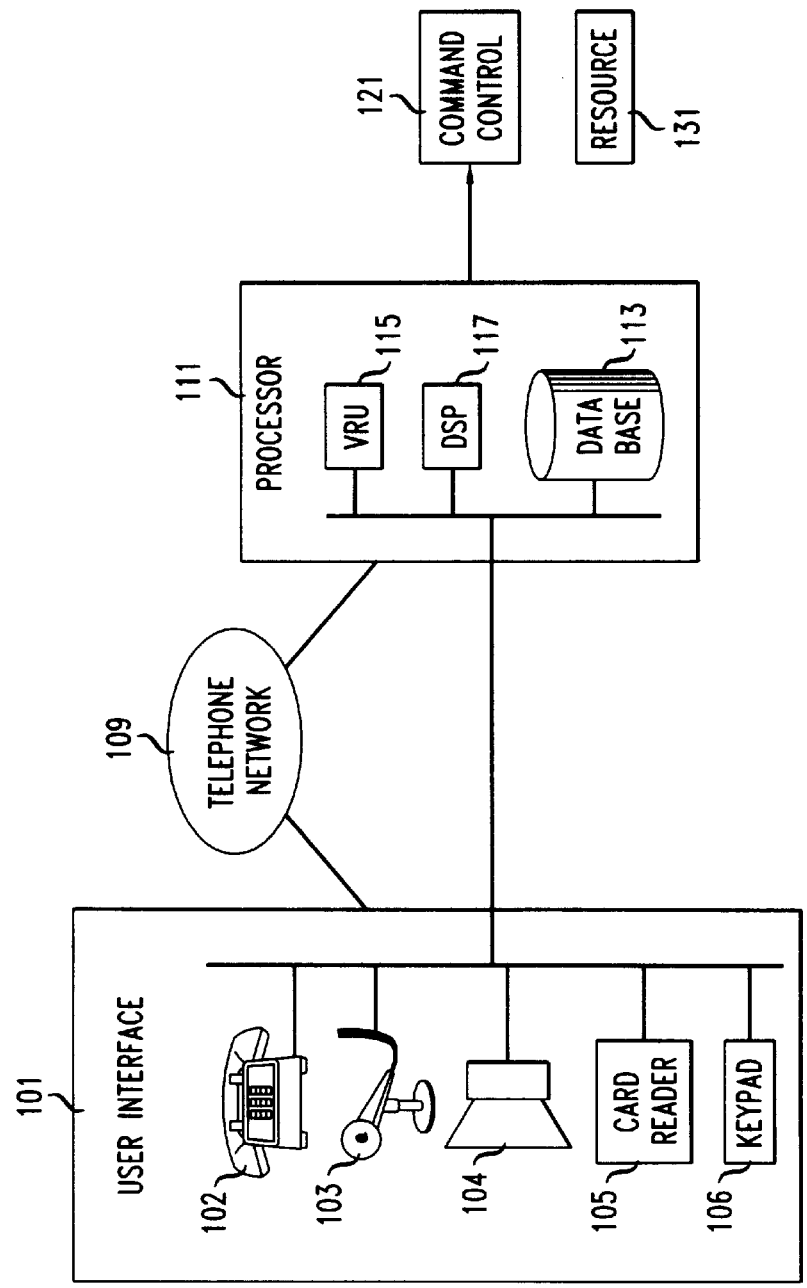
FIG. 1 is a block diagram illustrating a voice command control and verification system arranged in accordance with the present invention.

Referring first to FIG. 1, there is shown a block diagram illustrating a voice command control and verification system arranged in accordance with the present invention. A user interface 101 is arranged to allow users to interact with a processor 111, which may be co-located or remotely located and connected to interface 101 via a telecommunications network 109. The primary function of interface 101 is to allow a user of the system to (1) input and store one or more speech models or voice commands or phrases; (2) assert an identity; and (3) input voice commands. The particular arrangement of interface 101 depends upon the application in which the invention is used. When interface 101 is remote from processor 111, as when the present invention is used to enable access to a telecommunications network, interface 101 may include an ordinary telephone station set 102. When interface 101 is used in connection with an ATM machine, it may include a microphone 103 and loudspeaker 104, a card reader 105, and a keypad 106 for inputting a series of alphanumeric inputs.

Processor 111 consists of several interconnected modules which together perform the bulk of the processing needed to implement the present invention. First, a voice response unit (VRU) 115 is arranged to assist in the collection and storage of speech models and voice commands, and in the handling of voice commands thereafter applied to the system. VRU 115 may be implemented using a CONVERSANT audio response system available from AT&T, and is described in more detail below, in conjunction with FIG. 2. Second, a digital speech processor (DSP) 117 is arranged to build models of speech commands, both for automatic speech recognition (ASR) and speaker verification (SV) purposes, and to thereafter compare speech commands with stored models to both identify the commands and to verify the identity of the system user. DSP 117, may be implemented using a DSP 3 processor available from AT&T, and is described in more detail below, in conjunction with FIG. 3. Third, a database 113 is arranged to store speech models and other information pertaining to system users, in a series of records which may be formatted as shown in FIG. 6. Database 113 may be implemented as a stand-alone element, using any commercially available database product. Alternatively, database 113 may (a) be part of the database in VRU 115, or (b) may be contained in a portable device, such as a "Smart Card", carried by the user and inserted into the system in a card reader which is part of user interface 101. Details of "Smart Card" construction may be found in U.S. Pat. No. 4,798,322 issued on Jan. 17, 1989 to Bernstein et al.

When the elements in processor 111 have interpreted, using automatic speech recognition, what command was given, and have determined, through speaker verification, that a user of the system is in fact an authorized user, a control signal is extended from processor 111 to a command control element 121 to actually carry out the command, thereby allowing "access" to, or use of, a resource 131. The specific implementations of command control element 121 vary, depending upon the specific application of the present invention and the specific nature of resource 131. For example, when the invention is used to control the extension of calls through a telecommunications network, command control element 121 can be a switch that allows routing of a long distance call through remaining telecommunications network elements; in this example, access to elements of the network is considered to be the resource 131. When the invention is used to control an ATM transaction, command control element 121 can be a software control process that allows a customer to access information about his or her account or receive a cash withdrawal, both of which can be considered the resource 131.

Figure 2:
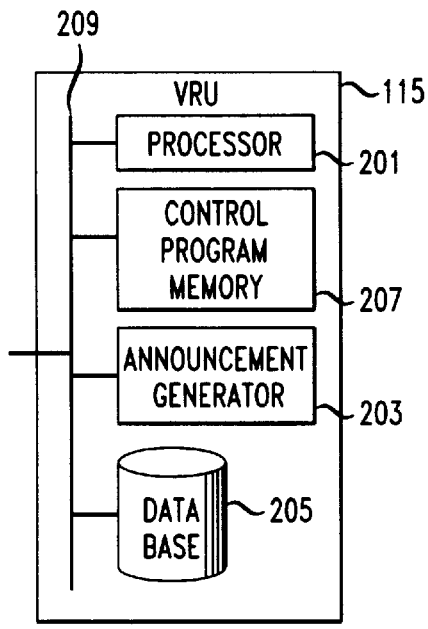
FIG. 2 is a block diagram illustrating one arrangement for VRU 115 of FIG. 1.

Referring now to FIG. 2, there is shown a block diagram illustrating one arrangement for VRU 115 of FIG. 1. VRU 115 includes a microprocessor 201 which, operating in accordance with stored programs contained in a control program memory 207, controls the functions of various other elements in the VRU, all of which are interconnected via a common bus 209. The processes carried out by the control programs stored in memory 207 are discussed more fully below, in connection with FIGS. 4 and 5. Other elements of VRU 115 include an announcement generator 203, which can play announcements, such as voice prompts, to a user of the system, and a database 205 that can store information relating to the announcements and also store information provided by a user. Microprocessor 201 can also perform logical functions and control the application of information to, and the receipt of information from, digital speech processor 117. Thus, when a user is prompted for a voice command, the utterance can be captured by VRU 115 and forwarded to DSP 117. Likewise, if user is prompted to assert an identity claim, information relating to that claim can be forwarded to DSP 117 and/or database 113.

Figure 3:
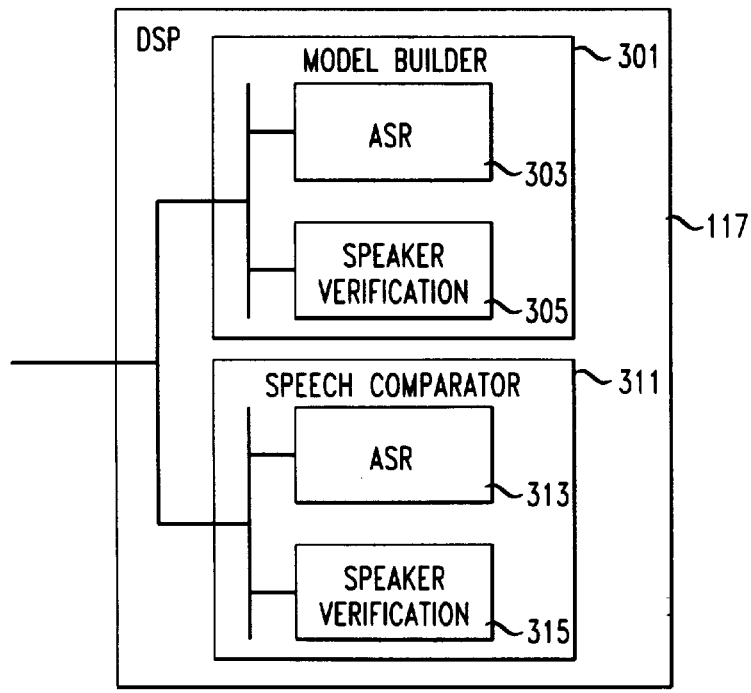
FIG. 3 is a block diagram illustrating one arrangement for DSP 117 of FIG. 1.

Referring now to FIG. 3, there is shown a block diagram illustrating one arrangement for digital speech processor (DSP) 117 of FIG. 1. Broadly speaking, DSP performs two functions in two interrelated elements, namely, the construction of speech models in model building element 301, and the comparison of speech models with spoken commands in speech comparison element 311. As stated previously, DSP 117 may be implemented in a DSP 3 processor available from AT&T, or any other similar processor, so that the arrangement of elements shown in FIG. 3 is primarily on a functional rather than a structural basis.

Model building element 301 and speech comparison element 311 each perform dual functions, one with respect to automatic speech recognition and the other with respect to speaker verification. In accordance with the invention, both functions are performed on the same set of voice commands that pertain to each user of the system. Thus, during the model building or training process described below in conjunction with FIG. 4, ASR element 303 in model building element 301 is arranged to construct a model of at least one (but usually several) voice commands that each user of the system may desire to later execute. These models are used in ASR element 313 in speech comparison element 311 for recognition purposes, i.e., to match a model of a speech command with a previously stored model and thereby identify WHAT the user said. These models are stored in database 113, or if desired, in database 205 in VRU 115, in association with an action component, which, as described below, indicates what action should be taken to actually implement the voice command for an authorized user of the system. Any one of many well know ASR techniques, such as the techniques described in U.S. Pat. No. 5,146,503 issued on Sep. 8, 1992 to Cameron et al., may be used in ASR elements 303 and 313.

Also during the model building process described below in conjunction with FIG. 4, speaker verification element 305 in model building element 301 is arranged to construct a model of the vocal characteristics contained in the same command. These vocal characteristics are used in speaker verification element 315 within speech comparison element 311 for verification purposes, i.e., to match vocal characteristics of a speech command with previously stored vocal characteristics and thereby determine that the person using the system that asserted an identity is the same person that is uttering or issuing the command. This therefore identifies WHO the user is. These vocal characteristics are also stored in database 113, or if desired, in database 205 in VRU 115. Any one of many well know speaker verification techniques, such as the techniques described in U.S. Pat. No. 4,363,102 issued on Dec. 7, 1982 to Holmgren et al., or in U.S. Pat. No. 5,216,720 issued on Jun. 1, 1993 to Doddington et al., may be used in speaker verification elements 313 and 315.

The functions of the various components of the system shown in FIGS. 1–3 will be further described below in conjunction with FIGS. 4 and 5, which illustrate the processes performed when the system is trained with voice commands, and thereafter, when voice commands are thereafter applied to the system, respectively.

Figure 4:
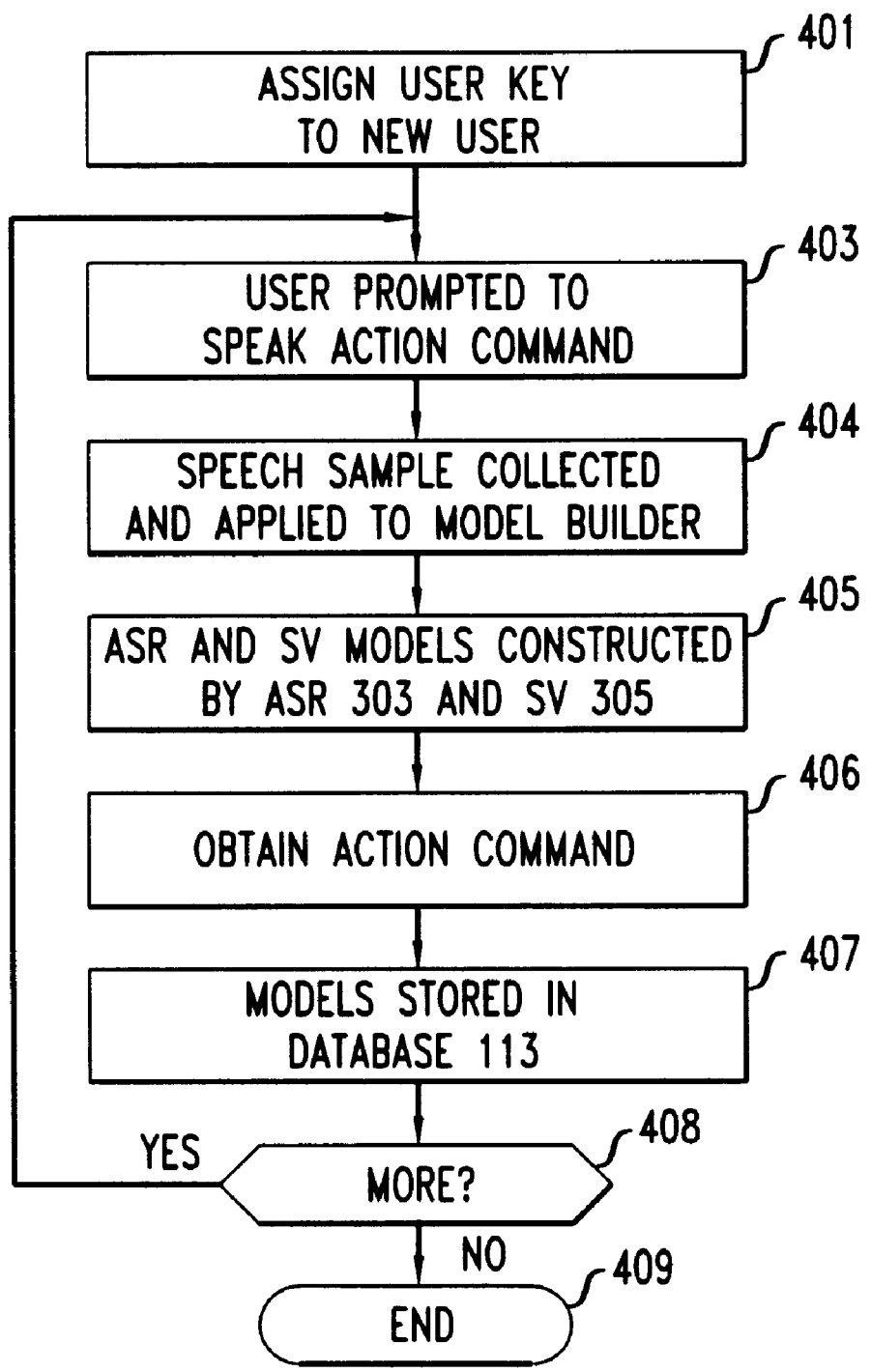
FIG. 4 is a flow diagram illustrating the process performed in the system of FIG. 1 when the system is trained with voice commands.

The training or model building process of FIG. 4 begins in step 401, when a new user is assigned a unique user key or system identity, which is stored in a record associated with that user in database 113. The format of a typical record created for each user is described below, in connection with FIG. 6. The user key assignment process can be implemented under the control of voice prompts issued by announcement generator 203 in VRU 115. In an application of the invention in a telecommunications environment, a user may thus first dial a telephone number associated with VRU 115 and, after being recognized as a new user, receive voice prompts that request name, address, billing information and other information from the user, all of which is stored in the record associated with that user key. The system, also through announcement generator 203, may thereafter announce to the user the unique user key or identifier to be used in subsequent transactions by which controlled access to resource 131 is obtained. The logical and control operations performed during this and subsequent steps are provided by microprocessor 201 operating pursuant to programs stored in control program memory 207. This aspect of the invention is well understood by those skilled in the art.

Following user key assignment in step 401, the training process includes a series of steps 403–407 which may be performed one or more times. Each time these steps are performed, ASR and speaker verification models of a voice command are formed, an association is made between the voice command and an action command which is to be carried out if it is determined that an authorized user issued the command, and the models and the associated action command are stored. As stated previously, the same command generates models used for both automatic speech recognition as well as speaker verification. Specifically, in step 403, the user is prompted by announcement generator 203 to speak a command. When the user utters that command, a speech sample is collected from the user and applied to model building element 301 in step 404, so that models can be constructed by ASR element 303 and speaker verification element 305. If necessary, an action command, describing the action to be taken when the command is spoken, is obtained from the user in step 406. The models and the associated action command are then stored in database 113 in step 407 in the record of the user whose key was assigned in step 401.

As an example applicable to the use of the present invention in a telecommunications environment, a user may be prompted for a voice command, such as "Call Home" in step 403 and that command spoken by a user in step 404. The models for that command, built in step 405, are associated with the telephone number for "home", which is obtained in step 406, and both the models and telephone number are then stored in database 113 in step 407. Thereafter, the series of steps 403–407 in FIG. 4 may be repeated multiple times, if a positive result occurs in step 408, indicating that there are more commands to be processed. As an example, the commands "Call Office", "Call Car" and "Call Mom" may then be associated with the telephone number for "office", "car" and "Mom", respectively. When all commands have been processed, no result is obtained in step 408 and the model building process is terminated in step 409.

Figure 5:
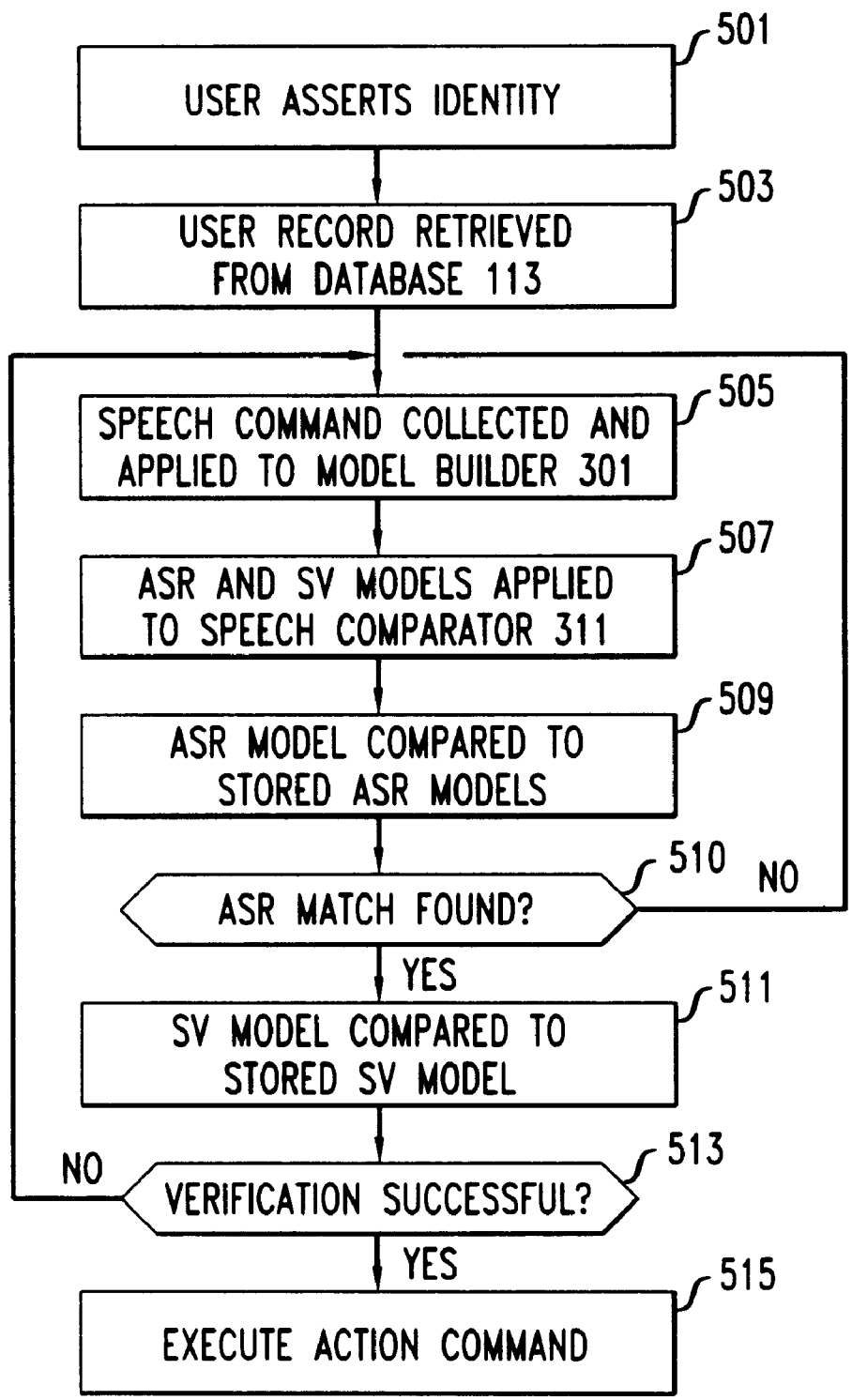
FIG. 5 is a flow diagram illustrating the process performed in the system of FIG. 1 when voice commands are thereafter applied to the system.

When a person desires to use the present invention to access resource 131 or otherwise use the system to accomplish a task using speech commands, the process followed is described in FIG. 5. First, in step 501, the person asserts his or her identity and utters a voice command. When the invention is implemented in a telecommunication environment, identity may be asserted when the user dials a unique telephone number assigned to that user. When the invention is implemented in an ATM environment, identity may be asserted when the user places a card in a card reader. In either event, the asserted identity is used to retrieve the appropriate record for that user from database 113 in step 503.

Next, in step 505, the speech command issued by the user is collected in VRU 115 and applied to speech model building element 301, in order to construct models of the command for both ASR and speaker verification purposes. These models are applied to comparison element 311 in step 507, so that the newly generated models can be compared to the models stored therein. In step 509, the ASR model of the command issued by the user is compared to the stored ASR models in ASR element 313 to determine if any stored command can be matched. If it is determined in step 510 that there is a match, the claimed identity of the user is then verified in step 511 by comparing the vocal characteristics contained in the same command with the vocal characteristics of the stored model, using speaker verification element 315. Upon successful verification in step 513, the voice command is executed in step 515 by applying the action component stored in database 113 in association with the voice command, to command control element 121. This may in turn result in the user gaining access to resource 131. If the verification in step 513 is not successful, the process of FIG. 5 may be repeated beginning with step 505. If an ASR match is not found in step 510, the process of FIG. 5 may also be repeated beginning with step 505.

Referring now to FIG. 6, the format of typical user records stored in database 113 is shown. Each user of the system is assigned a unique user identification code (ID) which is contained in column 601 and which identifies that user's record. The data in each record includes a series of speech commands contained in column 602 that are associated with a series of corresponding actions contained in column 603 that are carried out when the speech command is uttered by an authorized user and recognized by the system. For example, the record for the user with ID 1234 contains commands "home", "office", and "car". When these commands are uttered and recognized, associated telephone numbers (contained in column 603) are dialed. Likewise, the users with ID's 1235 and 9876 have other commands, such as "mom", "dad" and "sis" for user ID 1235, and "home", "fax" and "pager" for user 9876, each of which are associated with different telephone numbers. An additional user with ID 9999 could use the system of the present invention to interact with an ATM machine. For this user, if the word "loan" is uttered and recognized, the balance for a first loan account XXX is retrieved and displayed to the user, while if the word "savings" is uttered and recognized, the balance for a different savings account YYY is retrieved and displayed to the user.

The advantages of the present invention can be appreciated by an example comparing the use of a telephone calling card today with the use of a system implementing the present invention. In the existing calling card system, a customer dials 0 or 10-288-0, and then enters a ten-digit telephone number, representing the called party. The caller then enters an assigned fourteen-digit calling card number, which is verified. If the verification is successful, the call may then be completed. With the system of the present invention, the customer dials his or her assigned ten-digit access number, and then simply speaks his desired action, such as by saying "Call Home" (for example). If the identity of the caller is successfully verified, the call completes without further input from the caller. Thus, the present invention is much simpler and easier to use, from the caller's point of view.

The difference between the known approach to speaker verification and voice processing, and the approach taken by the present invention, is further illustrated by the following analysis:

Today, identity is confirmed and service is accessed by a process in which: 1) The user makes an identity claim; 2) The user verifies, through some means, that he/she is the claimant; 3) If verified, claimant then proceeds to issue commands to the service or product.

One variation of this approach, as described in the Hunt et al. patent identified above, is to combine steps 1 & 2 into a single step, whereby the claim and verification are accomplished in a single step, as by saying an account number. In that case, speaker-independent speech recognition is used to interpret the account number. Then, the voice pattern of the person saying the account number is matched against a model or template stored in association with that account number.

In accordance with the present invention, a different approach is taken, in that steps 2 & 3 are combined. An identity claim is made somehow, such as by using a unique telephone number assigned to the user. The user is then allowed to say a command (like "Call Home"). The command is interpreted using speaker dependent speech recognition. Concurrently, the voice pattern of the person issuing the command is matched against the speaker verification models made by the true speaker, stored in association with the unique telephone number.

If desired, the access telephone number can be made user selectable and changeable, in order to add yet another dimension to the system's ease of use. Of course, the most important benefit is that to the customer, it would appear that they have no explicit account number.

The present invention is not limited to call completion services, but could be used to provide a wide array of functionality to a user, once the identity of the user is verified by comparing stored speech characteristics associated with the dialed number to the characteristics of the person placing the call. This could include obtaining a person's bank balance by interacting with a system arranged in accordance with the invention, which controls access to a bank computer system. Note also that since the present invention does not require the input of a digit sequence for verification purposes, the platform providing the service can be accessed from a rotary telephone as well as a phone equipped with touch tone dialing. Also, the unique number to be dialed by each card holder may be assigned based, at least in part, on the preferences of the caller. For example, the call may be made to a "500" number, where some of the seven additional digits are selected by the card holder.

The present invention is also not limited to use in conjunction with the telecommunications network. Rather, the invention can be used in a "local" environment such as where a user interacts with a ATM machine at a particular location. In such an arrangement, the user may assert an identity claim by inserting a credit card or similar identification means in a card reader. The user may then issue a voice command such as "Get Balance". The system is arranged to first interpret the utterance by comparing the uttered command with speech models stored for that user. If the utterance matches a particular stored model, the user's identity is then verified by comparing a stored speaker verification model with the characteristics of the same uttered command. The system can thus be self-contained and not require the use of the telecommunications network to communicate with a central processor and database.

Various modifications and adaptations may be made to the present invention by those skilled in the art. For this reason, it is intended that the invention be limited only by the appended claims.

What is claimed is:

1. A method for executing voice commands for authorized users, comprising the steps of
    storing, for each authorized user, at least one speech model associated with a voice command, said command having an associated action component;
    receiving from a person claiming to be an authorized user, a claimed identity and a voice command;
    comparing said received voice command to said at least one stored speech model for the authorized user having said claimed identity;
    if said voice command matches said at least one stored speech model for said authorized user so that said voice command can be uniquely interpreted as corresponding to its associated action component, verifying said claimed identity of said person by further matching vocal characteristics of said voice command with said stored model; and
    if said identity is verified, utilizing said associated action component to execute said voice command for said person using said system.

2. A system for responding to voice commands, said system comprising:
    means for storing, for each user of said system, models of phrases representing commands in the voice of each user;
    means for receiving a particular phrase representing a command from a person claiming to be a particular one of said users;
    means for comparing said particular phrase with the models stored for said particular one of said users to identify said particular phrase;
    means for verifying the identity of said particular one of said users by comparing said particular phrase with the model of the same phrase which was previously stored; and
    means for performing a command associated with said particular phrase if said verification is positive.

3. A method for permitting a user to control a system with voice commands, comprising the steps of
    receiving a command spoken by said user and a claimed identity of said user;
    matching said command against stored models of phrases for said user having said claimed identity;
    if there is a matched stored model, verifying said claimed identity of said user by comparing the spoken command with said matched stored model; and
    upon successful verification, executing said command.

4. The invention defined in claim 3 wherein said executing step comprises
    executing an action component associated with said command.

5. A voice controlled telecommunications system comprising:
    means for assigning to each user a unique telephone number that the user dials to access the telecommunications network;
    means for storing for each user, models of voice commands accessible by a speech recognition system and by a speaker verification system;
    means for storing, for each of said commands, an associated destination telephone number;
    means in said speech recognition system responsive to dialing of said unique telephone number and uttering of a voice command by a user, for performing speech recognition by matching said voice command with one of said stored models of voice commands for that user;
    means in said speaker verification system responsive to said speech recognition means for verifying the identity of said user by comparing said voice command with the previously stored model of that voice command for the user; and
    means responsive to verification of the identity of the user for executing said voice command by completing the call to the desired destination using said destination telephone number associated with said command.

6. A method of recognizing voice commands of authorized users of a system, the method comprising the steps of:
    receiving a claim of identity from a person;
    receiving an utterance of a system command from said person;
    performing a speech recognition process on said utterance;
    performing a speaker verification process on said utterance;
    if said utterance is recognized as a command to said system and if said claimed identity is verified based on said utterance, providing a signal to said system indicating that a command has been presented by an authorized user for execution.

7. The method of claim 6 wherein said speech recognition process is performed with use of models of speech representing system commands.

8. The method of claim 7 wherein said speaker verification process is performed with use of at least one model of speech representing at least one command, said at least one model trained by the person whose identity is claimed.

9. The method of claim 8 further comprising the step of executing said recognized command.

* * * * *